UNITED STATES PATENT OFFICE.

JOSEPH KOETSCHET AND MAX THEUMANN, OF LYON, FRANCE, ASSIGNORS TO SOCIÉTÉ CHIMIQUE DES USINES DU RHONE, ANCIENNEMENT GILLIARD, P. MONNET ET CARTIER, OF PARIS, FRANCE.

ACETYLATION OF CELLULOSIC MATERIALS.

1,030,311.      Specification of Letters Patent.      Patented June 25, 1912.

No Drawing.      Application filed December 8, 1911. Serial No. 664,673.

*To all whom it may concern:*

Be it known that we, JOSEPH KOETSCHET and MAX THEUMANN, both of Lyon, France, have invented certain new and useful Improvements in the Acetylation of Cellulosic Materials, of which the following is a specification.

In all processes at present known for the production of acetyl celluloses, actic anhydrid or acetyl chlorid, pure or diluted, but always in liquid condition, is brought into reaction with cellulose and its hydrates. All these processes have the disadvantage that it is difficult to recover the surplus anhydrid.

We have discovered that acetyl celluloses can be very easily prepared by causing the acetylizing agent to act in the form of vapor upon cellulose and its hydrates.

This process presents two main advantages:—(1) The acetyl celluloses obtained retain the structure of the starting product. (2) The surplus anhydrid and the acetic acid formed can be readily recovered.

For carrying out the process, the vapors of the acetic anhydrid are brought into contact with the heated cellulose at a suitable temperature, which may with advantage correspond approximately to the saturation or condensation point of said vapors.

The action of the anhydrid at boiling temperature (137° C. under ordinary pressure) is very vigorous, and it may be moderated by reducing the pressure or by diluting the anhydrid vapors with suitable gases or vapors. In any case the surplus anhydrid and the acid formed may be readily recovered by condensing the vapors escaping from the acetylizing apparatus.

The acetyl cellulose formed, which in this process does not go into solution, retains the structure of the original material. As starting material we may employ cotton, paper, wood pulp, and other celluloses, mercerized or not, and also hydrocelluloses or cellulose hydrates, such materials being hereinafter included in the term cellulosic body. The materials can be used dry, or more or less moistened with water or diluted solutions of organic or mineral acids.

Example 1: In a cylindrical vessel connected at its upper part to a condenser and a vacuum pump, cotton impregnated with sulfuric acid (*e. g.* as in the Girard hydrolizing process) is suitably distributed; the pressure is reduced to 40 mm. and the cotton heated to 55° C. The vessel is then connected to a steam-heated boiler containing acetic anhydrid; the latter is heated to 50-55° C. and the pressure is reduced in order to produce abulition at the said temperature. The anhydrid vapors in their passage through the cotton convert the same rapidly into acetyl cellulose, and the issuing vapors are condensed. The reaction is terminated as soon for example as a test sample is soluble in chloroform; the anhydrid vapors are then exhausted from the vessel and the acetyl cellulose formed is worked up in the known way, that is to say, is thoroughly washed with water and dried.

Example 2: 100 grams of cotton are impregnated with 20 grams of a 3 per cent. sulfuric acid. The cotton thus prepared is completely acetylized by a three hours' treatment with anhydrid vapors at 40° C. The acetyl cellulose formed has the appearance and strength of the cotton employed, and is soluble in chloroform, acetone, tetrachlorethane and glacial acetic acid. The solutions are viscous; films made therefrom are durable and elastic.

Example 3: 100 grams of cotton are impregnated with 20 grams of a 1 per cent. sulfuric acid and treated as in the last example. The acetylation is terminated after 50 hours. The product has the appearance of cotton, but is somewhat increased in strength. It is soluble in chloroform and tetrachlorethane, and is insoluble in glacial acetic acid. The solutions are much more viscous than those of the last example, although the acetyl cellulose is not gelatinized.

Glacial acetic acid may be employed instead of water for diluting the sulfuric acid; this modification has the advantage that no acetic anhydrid is destroyed. On the other hand the sulfuric acid can be substituted by other mineral acids or by organic acids; for example sulfo-acetic acid or aryl sulfo acids, diluted with water or glacial acetic acid, may be employed. Any agents may be employed which assist the hydrolysis or acetylation of the cellulose.

What we claim as our invention and desire to secure by Letters Patent is:—

1. A process for acetylizing a cellulosic body, comprising subjecting the same to the action of acetic anhydrid vapors.

2. A process for acetylizing a cellulosic body, comprising subjecting the same to the action of acetic anhydrid vapors at reduced pressure.

3. A process for acetylizing a cellulosic body, comprising subjecting the same in a heated state to the action of acetic anhydrid vapors.

4. A process for acetylizing a cellulosic body, comprising treating the same with an acetylation promoting agent and subjecting the material so treated to the action of acetic anhydrid vapors.

5. A process for acetylizing a cellulosic body, comprising treating the same with an acid, and subjecting the material so treated to the action of acetic anhydrid vapors.

6. A process for acetylizing a cellulosic body, comprising treating the same with sulfuric acid, and subjecting the material so treated to the action of acetic anhydrid vapors.

7. A process for acetylizing a cellulosic body, comprising treating the same with a dilute acid and subjecting the material so treated to the action of acetic anhydrid vapors at reduced pressure.

8. A process for acetylizing a cellulosic body, comprising treating the same with an acetylation promoting agent and subjecting the material so treated, and in a heated state, to the action of acetic anhydrid vapors.

9. A process for acetylizing a cellulosic body, comprising treating the same with an acid and subjecting the material so treated, and in a heated state, to the action of acetic anhydrid vapors.

10. A process for acetylizing a cellulosic body, comprising treating the same with an acid, subjecting the material so treated, and in a heated state, to the action of acetic anhydride vapors, and recovering the surplus acetic anhydrid.

11. A process for acetylizing a cellulosic body, comprising treating the same with an acetylation promoting agent, subjecting the material so treated, and in a heated state, to the action of acetic anhydrid vapors under reduced pressure, and removing and condensing surplus acetic anhydrid.

12. A process for acetylizing a cellulosic body, comprising treating the same with a diluted sulfuric acid, subjecting the material so treated, and in a heated state, to the action of acetic anhydrid vapors under reduced pressure, and extracting and condensing surplus acetic anhydrid.

In testimony whereof we have signed our names to this specification in the presence of two subscribing witnesses.

JOSEPH KOETSCHET.
MAX THEUMANN.

Witnesses:
JNO. N. BROWN,
JULIEN TIGUET.